(12) United States Patent
Tsukada et al.

(10) Patent No.: US 11,926,995 B2
(45) Date of Patent: Mar. 12, 2024

(54) WORK MACHINE

(71) Applicant: HITACHI CONSTRUCTION MACHINERY CO., LTD., Tokyo (JP)

(72) Inventors: Yoko Tsukada, Tokyo (JP); Masanori Ichinose, Tokyo (JP); Masaki Higurashi, Tokyo (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 465 days.

(21) Appl. No.: 17/286,918

(22) PCT Filed: Dec. 24, 2019

(86) PCT No.: PCT/JP2019/050618
§ 371 (c)(1),
(2) Date: Apr. 20, 2021

(87) PCT Pub. No.: WO2020/145132
PCT Pub. Date: Jul. 16, 2020

(65) Prior Publication Data
US 2021/0372091 A1    Dec. 2, 2021

(30) Foreign Application Priority Data
Jan. 8, 2019  (JP) .................. 2019-000969

(51) Int. Cl.
*E02F 9/26* (2006.01)
*E02F 3/43* (2006.01)

(52) U.S. Cl.
CPC .............. *E02F 9/265* (2013.01); *E02F 3/431* (2013.01); *E02F 3/435* (2013.01); *E02F 9/262* (2013.01)

(58) Field of Classification Search
CPC . E02F 9/265; E02F 3/431; E02F 3/435; E02F 9/262
See application file for complete search history.

(56) References Cited

U.S. PATENT DOCUMENTS

| | | | | |
|---|---|---|---|---|
| 4,627,013 A | * | 12/1986 | Ichiyama | E02F 9/264 177/25.14 |
| 4,691,792 A | * | 9/1987 | Shintani | G01G 19/10 177/208 |

(Continued)

FOREIGN PATENT DOCUMENTS

| | | | | |
|---|---|---|---|---|
| CN | 114761641 A | * | 7/2022 | ............. E02F 3/431 |
| DE | 112013000251 B3 | * | 8/2015 | ............. E02F 3/307 |

(Continued)

OTHER PUBLICATIONS

Translation of DE-112013000251-B3, 27 pages (Year: 2015).*

(Continued)

*Primary Examiner* — Dale W Hilgendorf
(74) *Attorney, Agent, or Firm* — MATTINGLY & MALUR, PC (57) ABSTRACT

A wheel loader includes a lift arm, bucket, a lift cylinder that rotates the lift arm, a hydraulic force detection unit that detects a hydraulic force of the lift cylinder, an arm angle detection unit that detects a rotation angle of the lift arm, and a controller that calculates a weight of the load. A hydraulic force measurement unit measures a hydraulic force with the rotation angle of the lift arm within a predetermined measurement angle range; and a hydraulic-force-change-rate calculation unit calculates a change rate of the hydraulic force with respect to the rotation angle of the lift arm, and then calculates a new hydraulic force change rate within the measurement angle range. The controller corrects an error of the weight of the load occurring due to the inclination angle of the body on the basis of the new hydraulic force change rate calculated by the hydraulic-force-change-rate calculation unit.

9 Claims, 10 Drawing Sheets

(56) References Cited

U.S. PATENT DOCUMENTS

| | | | | |
|---|---|---|---|---|
| 5,824,965 A * | 10/1998 | Fujii | ................... | G01G 19/12 |
| | | | | 177/136 |
| 6,098,322 A * | 8/2000 | Tozawa | ................ | E02F 3/437 |
| | | | | 701/50 |
| 6,518,519 B1 * | 2/2003 | Crane, III | ............... | E02F 9/264 |
| | | | | 177/136 |
| 8,909,437 B2 * | 12/2014 | Zhu | ................... | E02F 3/435 |
| | | | | 701/87 |
| 11,131,083 B2 * | 9/2021 | Gratton | .................. | E02F 9/26 |
| 2008/0169131 A1 * | 7/2008 | Takeda | ................ | G01G 19/10 |
| | | | | 177/136 |
| 2010/0161185 A1 * | 6/2010 | Marathe | ............... | E02F 3/431 |
| | | | | 701/50 |
| 2014/0039767 A1 * | 2/2014 | Jensen | ................ | E02F 9/2079 |
| | | | | 701/50 |
| 2016/0265187 A1 * | 9/2016 | Baba | ..................... | E02F 3/963 |
| 2016/0273194 A1 * | 9/2016 | Ikegami | ............... | E02F 9/2267 |
| 2017/0191245 A1 * | 7/2017 | Shatters | ................ | E02F 3/283 |
| 2019/0017248 A1 * | 1/2019 | Okada | ..................... | E02F 9/20 |
| 2019/0345697 A1 * | 11/2019 | Ishihara | ............... | E02F 3/435 |
| 2020/0157768 A1 * | 5/2020 | Ito | .......................... | E02F 9/2207 |
| 2021/0293000 A1 * | 9/2021 | Currier | .................. | E02F 9/265 |
| 2022/0127817 A1 * | 4/2022 | Sano | ..................... | E02F 9/265 |
| 2023/0279634 A1 * | 9/2023 | Yamamoto | ............. | E02F 9/265 |
| | | | | 414/685 |

FOREIGN PATENT DOCUMENTS

| | | | | |
|---|---|---|---|---|
| JP | H0586636 A * | 4/1993 | ............... | E02F 9/24 |
| JP | 06-000736 Y2 | 1/1994 | | |
| JP | 2001-99701 A | 4/2001 | | |
| JP | 2006-336390 A | 12/2006 | | |
| JP | 4338678 B2 | 10/2009 | | |
| JP | 2020165259 A * | 10/2020 | ............... | E02F 9/20 |
| WO | 2006/098218 A1 | 9/2006 | | |

OTHER PUBLICATIONS

Translation of JP-2020165259-A, 21 pages (Year: 2020).*
Translation of JP-H0586636-A, 9 pages (Year: 1993).*
Translation of CN-114761641-A, 13 pages (Year: 2022).*
International Search Report of PCT/JP2019/050618 dated Mar. 17, 2020.

* cited by examiner

| | Hydraulic-force change rate | | | |
|---|---|---|---|---|
| | $k\_1$ | $k\_2$ | $\cdots$ | $k\_n$ |
| Ne_1 | $\alpha 0\_11$ | $\alpha 0\_12$ | $\cdots$ | $\alpha 0\_1n$ |
| Ne_2 | $\alpha 0\_21$ | $\alpha 0\_22$ | $\cdots$ | $\alpha 0\_2n$ |
| $\vdots$ | $\vdots$ | $\vdots$ | $\ddots$ | $\vdots$ |
| Ne_m | $\alpha 0\_m1$ | $\alpha 0\_m2$ | $\cdots$ | $\alpha 0\_mn$ |

(Leftmost column labeled: Number of engine revolutions)

Fig. 5

| Number of engine revolutions | Hydraulic-force change rate in horizontal position |
|---|---|
| Ne_1 | kh_1 |
| Ne_2 | kh_2 |
| $\vdots$ | $\vdots$ |
| Ne_n | kh_n |

| | | Hydraulic-force change rate | | | |
|---|---|---|---|---|---|
| | | k_1 | k_2 | ··· | k_n |
| Number of engine revolutions | Ne_1 | θ_11 | θ_12 | ··· | θ_1n |
| | Ne_2 | θ_21 | θ_22 | ··· | θ_2n |
| | ⋮ | ⋮ | ⋮ | ⋱ | ⋮ |
| | Ne_m | θ_m1 | θ_m2 | ··· | θ_mn |

WORK MACHINE

TECHNICAL FIELD

The present invention relates to work machines.

BACKGROUND ART

Conventionally, there is known a work machine, such as a wheel loader, that measures the weight of a load while a bucket (i.e., work implement) performs loading work of the load (see, for example, Patent Literature 1). When rotating a lift arm with the bucket by a hydraulic cylinder, the work machine disclosed in Patent Literature 1 measures the weight of the load by using a hydraulic pressure on the tale side (bottom side) of the hydraulic cylinder and a hydraulic pressure on the rod side of the hydraulic cylinder. At this time, a measurement error caused by the rotation speed of the lift arm, the number of engine revolutions, the traveling speed of the vehicle body, and the like is corrected by using various kinds of correction maps, thereby increasing the accuracy of measuring the weight of the load.

CITATION LIST

Patent Literature

Patent Literature 1: JP 4338678 B

SUMMARY OF INVENTION

Technical Problem

By the way, when a load is loaded onto a carrier machine such as a dump truck on an inclined ground, the hydraulic pressure of the hydraulic cylinder may be affected by the inclination and an error may occur in measuring the weight of the load. In the work machine disclosed in Patent Literature 1, although a measurement error caused by the rotation speed of the lift arm, the number of engine revolutions, the traveling speed of the vehicle body, and the like is corrected, an error caused by the inclination of the body will not be corrected. There may be a configuration of providing a detection unit for detecting an inclination angle of the body, but this requires change from the existing component configuration.

In view of the foregoing, it is an object of the present disclosure to provide a work machine capable of correcting a weight measurement error on an inclined ground, without providing a detection unit for detecting an inclination angle of the body.

Solution to Problem

According to one aspect of the present disclosure, there is provided a work machine including: a lift arm with a work implement capable of loading a load; a hydraulic actuator configured to rotate the lift arm; a hydraulic force detection unit configured to detect a hydraulic force of the hydraulic actuator; an arm angle detection unit configured to detect a rotation angle of the lift arm; and a controller configured to calculate a weight of the load, in which: the controller includes a hydraulic force measurement unit configured to measure a hydraulic force with the rotation angle of the lift arm within a predetermined measurement angle range; and a hydraulic-force-change-rate calculation unit configured to calculate a change rate of the hydraulic force with respect to the rotation angle of the lift arm as a hydraulic force change rate, and then calculate a new hydraulic force change rate by dividing the hydraulic force change rate by an average hydraulic force within the measurement angle range, and is configured to correct an error of the weight of the load occurring due to the inclination angle of the body on the basis of the new hydraulic force change rate calculated by the hydraulic-force-change-rate calculation unit.

Advantageous Effects of Invention

According to the present disclosure, when working on an inclined ground, the work machine can correct an error caused by the inclination angle of the body and measure the weight of the load with high accuracy, without change from the existing component configuration. Further features of the present disclosure will become clear from the description in this specification and the attached drawings. In addition, the problem to be solved, the configurations, and the advantageous effects other than those described above will become clear from the following description of the embodiment.

BRIEF DESCRIPTION OF DRAWINGS

FIG. 3 explains correction processing according to the first embodiment, in which

DESCRIPTION OF EMBODIMENTS

First Embodiment

Hereinafter, a wheel loader according to the first embodiment will be described with reference to FIG. 1 to FIG. 7. It should be noted that the wheel loader will be described as one of the examples of the work machine in the following description. In describing FIG. 3 to FIG. 7, the reference numerals of FIG. 1 and FIG. 2 will be appropriately used for convenience in explanation.

Figure 1:
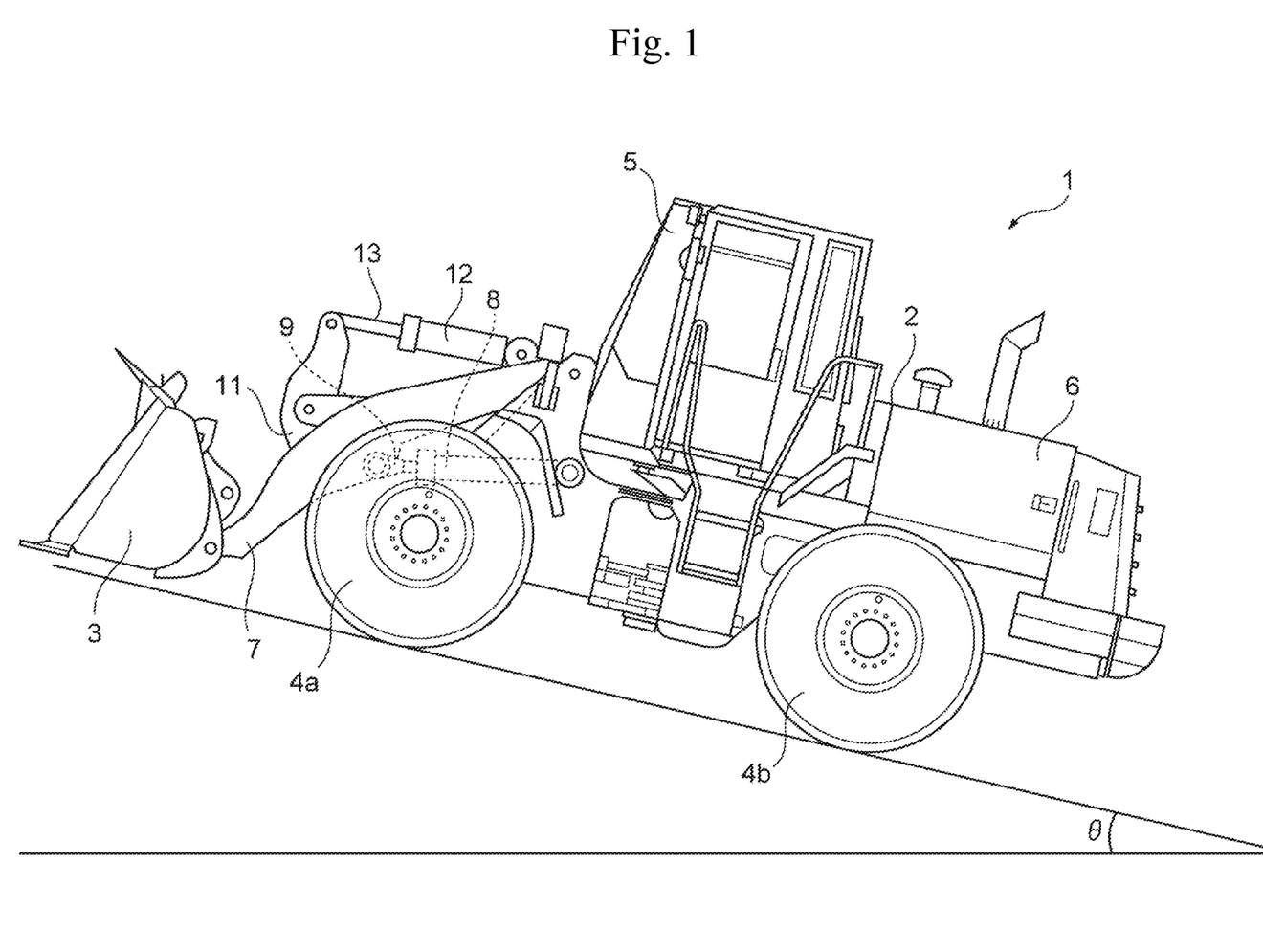
FIG. 1 is a side view of a wheel loader according to a first embodiment.

FIG. 1 is a side view of a wheel loader 1 according to the first embodiment. The wheel loader 1 is a work machine that loads a load such as earth and sand dug by a bucket (i.e., work implement) 3 onto a carrier machine or carries a load a short distance. The wheel loader 1 includes a body 2, and the lower part of the body 2 is provided with a front wheel 4a and a rear wheel 4b. The front wheel 4a and the rear wheel 4b allow the wheel loader 1 to travel on an irregular ground or an inclined ground. The upper part of the body 2 of the wheel loader 1 is provided with an operation room 5, which includes a steering wheel and various control levers. The rear part of the body 2 of the wheel loader 1 is provided with an engine room 6, which has an engine (not illustrated) mounted therein.

The front part of the body 2 of the wheel loader 1 has vertically rotatably attached thereto a pair of right and left lift arms 7 that extends from the body 2 to the front. The approximately intermediate position of the lift arm 7 and the front part of the body 2 are coupled together by a lift cylinder (hydraulic actuator) 8. When a hydraulic pressure is supplied to the bottom chamber of the lift cylinder 8, a rod 9 is extended and the lift arm 7 is rotated upward. When a hydraulic pressure is supplied to the rod chamber of the lift cylinder 8, the rod 9 is retracted and the lift arm 7 is rotated downward. It should be noted that the bottom chamber of the lift cylinder 8 is a hydraulic chamber with a large pressure receiving area adjacent to the operation room 5, and the rod chamber is a hydraulic chamber with a small pressure receiving area adjacent to the head which houses the rod 9.

The distal end portion of the pair of right and left lift arms 7 has rotatably attached thereto a bucket 3. A bell crank 11 is coupled to the bucket 3, and the bell crank 11 and the front part of the body 2 are coupled together by a bucket cylinder 12. When a hydraulic pressure is supplied to the bottom chamber of the bucket cylinder 12, a rod 13 is extended and the bucket 3 is rotated upward. When a hydraulic pressure is supplied to the rod chamber of the bucket cylinder 12, the rod 13 is retracted and the bucket 3 is rotated downward. It should be noted that the bottom chamber of the bucket cylinder 12 is a hydraulic chamber with a large pressure receiving area adjacent to the operation room 5, and the rod chamber is a hydraulic chamber with a small pressure receiving area adjacent to the head which houses the rod 13.

In addition, the wheel loader 1 includes a weight measurement device for measuring the weight of a load when loaded. Since the wheel loader 1 performs loading work not only on a flat ground but also on an inclined ground, the weight measurement by the weight measurement device may be affected by an inclination angle θ of the body 2 of the wheel loader 1. Then, the weight measurement device corrects a measurement error caused by the inclination angle θ of the body 2 and measures the weight of the load. It should be noted that while the lift arm 7 is rotated upward in a state where the bucket 3 is rotated toward the operation room 5 (i.e., full tilt), the weight measurement device performs the weight measurement within a predetermined measurement angle range.

Figure 2:
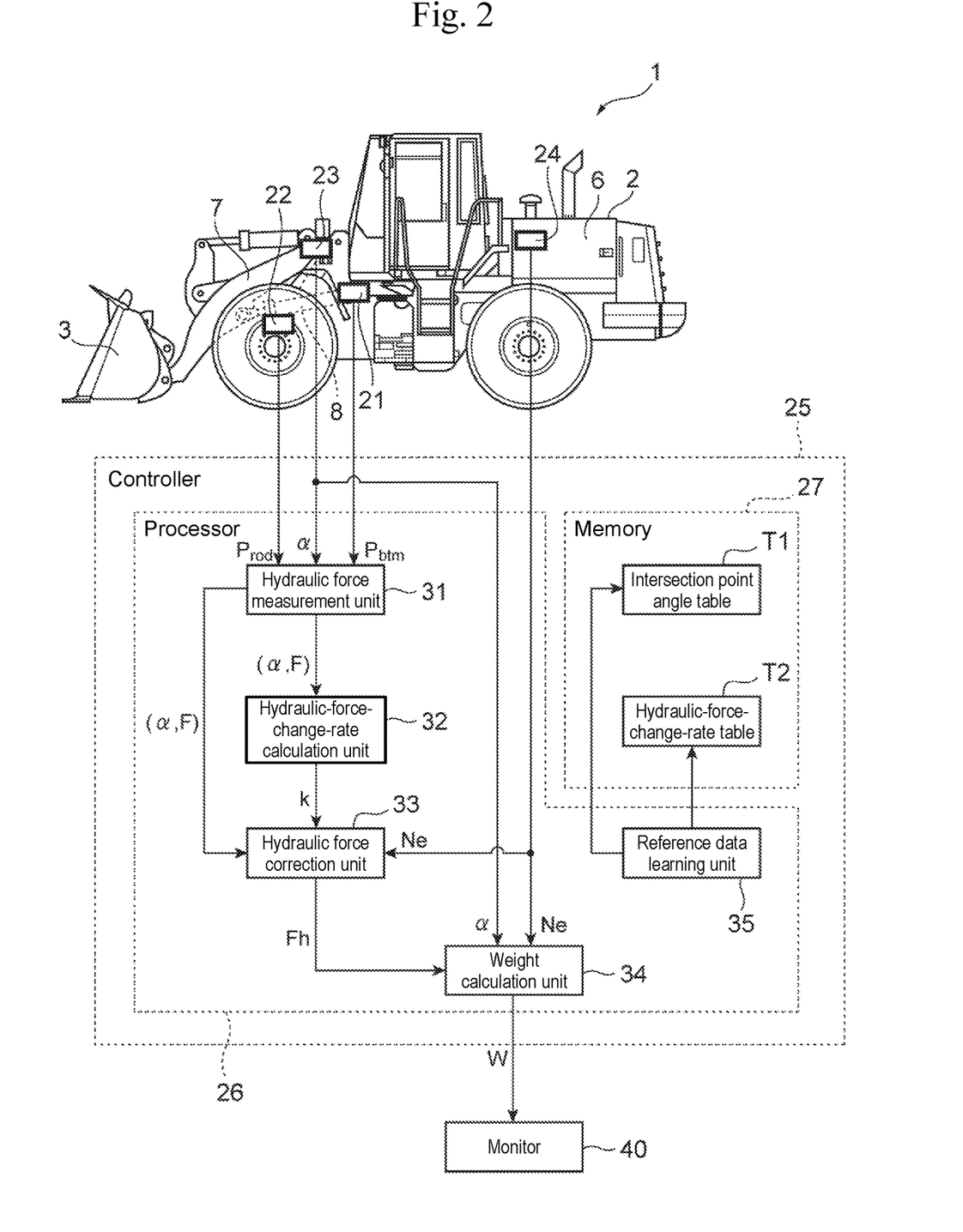
FIG. 2 is a configuration diagram of a weight measurement device according to the first embodiment.

FIG. 2 is a configuration diagram of the weight measurement device according to the first embodiment. The bottom side of the lift cylinder 8 includes a bottom pressure detection unit 21 for detecting a bottom pressure of the lift cylinder 8, and the rod side of the lift cylinder 8 includes a rod pressure detection unit 22 for detecting a rod pressure of the lift cylinder 8. The bottom pressure detection unit 21 and the rod pressure detection unit 22 function as hydraulic force detection units and calculate a hydraulic force F of the lift cylinder 8 on the basis of the pressure difference between the rod pressure and the bottom pressure. The proximal end of the lift arm 7 includes an arm angle detection unit 23 for detecting a rotation angle α of the lift arm 7 with respect to the body 2, and the engine of the engine room 6 includes a number-of-engine-revolutions detection unit 24 for detecting the number of engine revolutions Ne.

The weight measurement device includes a controller 25 for calculating the weight of the load according to the outputs from the detection units. The controller 25 includes a hydraulic force measurement unit 31, a hydraulic-force-change-rate calculation unit 32, a hydraulic force correction unit 33, a weight calculation unit 34, and a reference data learning unit 35. The controller 25 is constituted of hardware such as a processor 26 and a memory 27, for example. The processor 26 implements each unit of the controller 25. Further, the memory 27 stores therein the reference tables such as an intersection point angle table T1, a hydraulic-force-change-rate table T2, and the like that are referenced by the hydraulic force correction unit 33, and parameters and programs that are used in various kinds of processing, for example.

The hydraulic force measurement unit 31 receives a bottom pressure $P_{btm}$ from the bottom pressure detection unit 21, receives a rod pressure $P_{rod}$ from the rod pressure detection unit 22, and receives a rotation angle α of the lift arm 7 from the arm angle detection unit 23. The hydraulic force measurement unit 31 measures the hydraulic force F in the measurement on the basis of the bottom pressure $P_{btm}$ and the rod pressure $P_{rod}$ with the rotation angle α of the lift arm 7 within a predetermined measurement angle range. It should be noted that the hydraulic force F is calculated by the following equation (1), where the bottom pressure is $P_{btm}$, the pressure receiving area on the bottom side is $A_{btm}$, the rod pressure is $P_{rod}$, and the pressure receiving area on the rod side is $A_{rod}$.

$$F = P_{btm} \times A_{btm} - P_{rod} \times A_{rod} \tag{1}$$

The hydraulic-force-change-rate calculation unit 32 receives a measurement result of the hydraulic force F according to the rotation angle α of the lift arm 7 from the hydraulic force measurement unit 31. The hydraulic-force-change-rate calculation unit 32 calculates a hydraulic-force-change rate K, which is a change rate of the hydraulic force F with respect to the rotation angle α of the lift arm 7, from the measurement result of the hydraulic force F, normalizes the hydraulic-force change rate K by an average hydraulic force Fave (see FIG. 3A) within the measurement angle range, and calculates a new hydraulic-force change rate k. Though details will be described later, the normalized hydraulic-force change rate k changes according to the inclination angle θ of the body 2, and in the present embodiment, the error of the hydraulic force F occurring due to the inclination angle θ of the body 2 is corrected by using the normalized hydraulic-force change rate k.

The hydraulic force correction unit 33 receives the number of engine revolutions Ne from the number-of-engine-revolutions detection unit 24, receives the hydraulic-force change rate K from the hydraulic-force-change-rate calculation unit 32, and receives a measurement result from the hydraulic force measurement unit 31. The hydraulic force correction unit 33 corrects the error of the hydraulic force F in the measurement occurring due to the inclination angle θ of the body 2 on the basis of the number of engine revolutions Ne and the normalized hydraulic-force change rate k and calculates a hydraulic force Fh in the horizontal position of the body. In this case, on the basis of the number of engine revolutions Ne and the normalized hydraulic-force change rate k, and the measurement result indicating the relation between the rotation angle α of the lift arm 7 and the hydraulic force F in the measurement (i.e., straight line L1 of FIG. 3A), the hydraulic force correction unit 33 obtains corrected information indicating the relation between the rotation angle α of the lift arm 7 and the hydraulic force Fh in the horizontal position of the body (i.e., straight line L2 of FIG. 3A).

By using the corrected information, the hydraulic force correction unit 33 obtains a hydraulic force Fh in the horizontal position of the body according to any given rotation angle α of the lift arm 7. In this hydraulic force correction processing, the hydraulic force correction unit 33 references the intersection point angle table T1 and the hydraulic-force-change-rate table T2 in order to obtain the relation between the rotation angle α of the lift arm 7 and the hydraulic force Fh in the horizontal position of the body from the relation between the rotation angle α of the lift arm 7 and the hydraulic force F (see FIG. 4 and FIG. 5). The reference data in these reference tables is learned in advance by the reference data learning unit 35 while changing various conditions. It should be noted that the intersection point angle table T1 and the hydraulic-force-change-rate table T2 will be described in detail later.

The weight calculation unit 34 receives the number of engine revolutions Ne from the number-of-engine-revolutions detection unit 24, receives the rotation angle α of the lift arm 7 from the arm angle detection unit 23, and receives the hydraulic force Fh in the horizontal position of the body from the hydraulic force correction unit 33. The weight calculation unit 34 calculates a weight W of a load on the basis of the number of engine revolutions Ne, the rotation angle α of the lift arm 7, and the corrected hydraulic force Fh in the horizontal position of the body. The weight W of the load calculated by the weight calculation unit 34 is displayed on a monitor 40. The monitor 40 functions also as a notification unit for notifying that the weight W of the load is being corrected. This allows an operator to correctly recognize whether the weight displayed on the monitor 40 is a corrected weight.

Figure 3A:
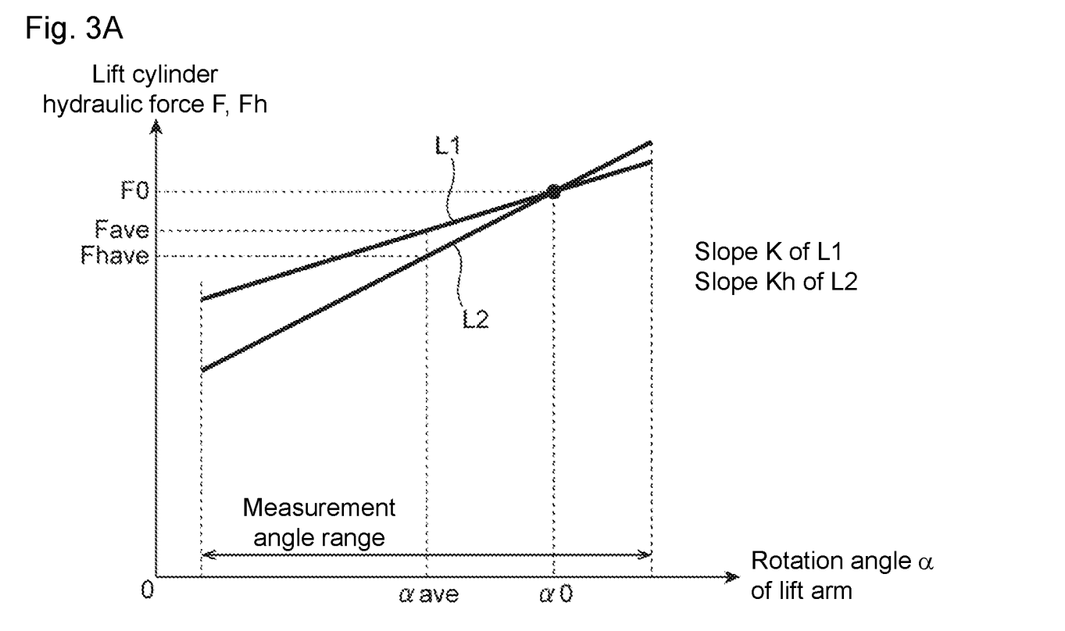
FIG. 3A illustrates the relation between an inclination angle of a lift arm and a hydraulic force before normalization.

Next, a method for measuring a weight of a load will be described in detail. FIG. 3 explains the correction processing according to the first embodiment. FIG. 3A is a graph showing the relation between the rotation angle α of the lift arm 7 and the hydraulic forces F, Fh acting on the lift cylinder 8. The straight line L1 indicates the relation between the rotation angle α of the lift arm 7 and the hydraulic force F in the measurement, and the straight line L2 indicates the relation between the rotation angle α of the lift arm 7 and the hydraulic force Fh in the horizontal position of the body. The straight line L1 is the measurement result obtained by the hydraulic force measurement unit 31, and the straight line L2 is a graph for calculating the hydraulic force Fh in the horizontal position of the body from any given rotation angle α of the lift arm 7.

Figure 3B:
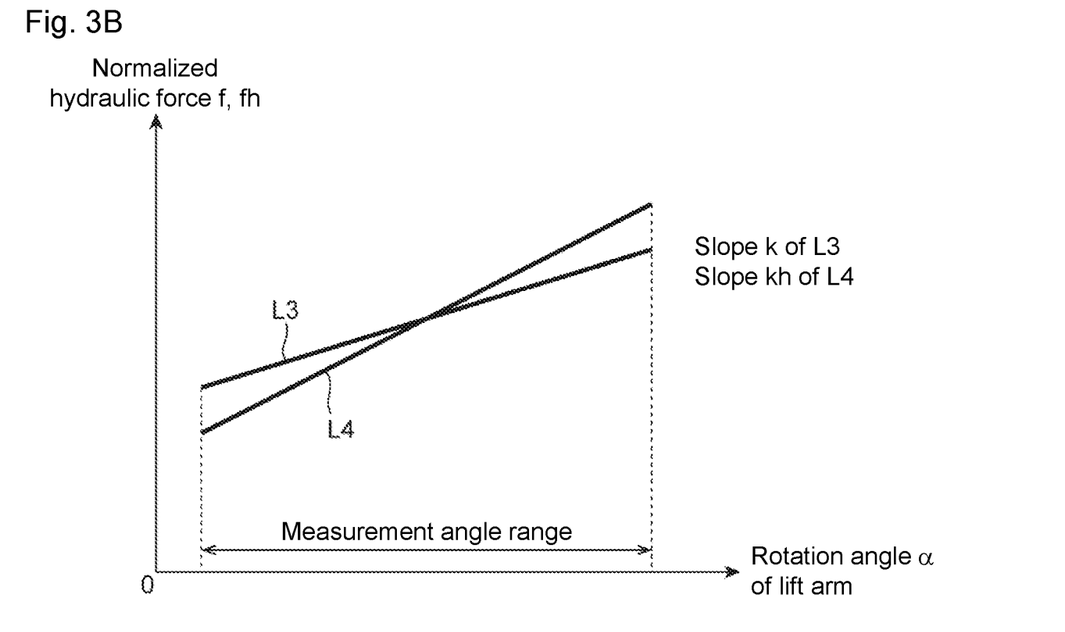
FIG. 3B illustrates the relation between an inclination angle of a lift arm and a normalized hydraulic force.

The hydraulic forces F, Fh in the measurement (i.e., in the inclined position of the body) and in the horizontal position of the body illustrated in FIG. 3A change in proportion to the weight. Thus, an effect of the weight on the hydraulic forces F, Fh is reduced by dividing them by average hydraulic forces Fave, Fhave, respectively, within the predetermined measurement angle range. In the present embodiment, this processing is referred to as normalization. Through this normalization processing, the hydraulic-force change rates K, Kh (described later) also change to k, kh, which are obtained by dividing the hydraulic-force change rates K, Kh by the average hydraulic forces Fave, Fhave, respectively. FIG. 3B is a graph showing the relation between the rotation angle α of the lift arm 7 and the normalized hydraulic forces f, fh acting on the lift cylinder 8. The straight line L3 is a graph corresponding to the straight line L1 and indicates the relation between the rotation angle α of the lift arm 7 and the normalized hydraulic force f. The straight line L4 is a graph corresponding to the straight line L2 and indicates the relation between the rotation angle α of the lift arm 7 and the normalized hydraulic force fh.

The normalized hydraulic force f is calculated by the following equation (2), where the hydraulic force in the measurement is F, and the average hydraulic force within the predetermined measurement angle range is Fave. In addition, the normalized hydraulic force fh is calculated by the following equation (3), where the hydraulic force in the horizontal position of the body is Fh, and the average hydraulic force within the predetermined measurement angle range is Fhave. It should be noted that in FIG. 3A, αave denotes an average angle within the predetermined measurement angle range.

$$f = F/F\text{ave} \qquad (2)$$

$$fh = Fh/Fh\text{ave} \qquad (3)$$

In addition, the predetermined measurement angle range is set as an angle range within which the relation between the rotation angle α of the lift arm 7 and the hydraulic force F of the lift cylinder 8 is indicated by the straight line, that is, an angle range having a small measurement error of the hydraulic force F occurring based on the measurement principle. It should be noted that the measurement error of the hydraulic force F occurs, for example, when the measurement is affected by the hydraulic force of the bucket cylinder 12. By measuring the hydraulic force F of the lift cylinder 8 while changing the rotation angle α the lift arm 7 within the predetermined measurement angle range, it is possible to express the rotation angle α of the lift arm 7 and the hydraulic force F of the lift cylinder 8 as functions of the straight line L1.

The hydraulic force correction unit 33 calculates the straight line L2 indicating a change in the hydraulic force Fh in the horizontal position of the body with respect to the rotation angle α of the lift arm 7 from the straight line L1 indicating a change in the hydraulic force F in the measurement with respect to the rotation angle α of the lift arm 7. The slope of the straight line L1 shows a hydraulic-force change rate K, which is a change rate of the hydraulic force F in the measurement with respect to the rotation angle α of the lift arm 7. The slope of the straight line L2 shows a hydraulic-force change rate Kh, which is a change rate of the hydraulic force Fh in the horizontal position of the body with respect to the rotation angle α of the lift arm 7. Further, the straight lines L1, L2 intersect at the intersection point (α0, F0). With the intersection point (α0, F0) and the hydraulic-force change rate Kh of the straight line L2, it is possible to calculate the straight line L2.

First, the calculation processing at the intersection point (α0, F0) will be described. The intersection point angle α0 defined by the straight line L1 in the measurement and the straight line L2 in the horizontal position of the body is the rotation angle α of the lift arm 7 in which the hydraulic force F in the measurement is equal to the hydraulic force Fh in the horizontal position of the body. The straight line L1 in the measurement and the straight line L2 in the horizontal position of the body change such that, as the weight W increases, the hydraulic forces F, Fh are shifted upward and the slopes K, Kh increase, whereas as the weight W decreases, the hydraulic forces F, Fh are shifted downward and the slopes K, Kh decrease. At this time, even if the weight W is changed, the straight lines L1, L2 intersect at the same angle α0, and thus the intersection point angle α0 is not affected by the weight W.

The lift cylinder 8 is supplied with oil from a pump driven by the engine, and thus the hydraulic force F at the rotation angle α of the lift arm 7 changes also depending on the number of engine revolutions Ne, in addition to the weight W and the inclination angle θ of the body 2. The hydraulic-force change rate k after the normalization is uniquely determined by the inclination angle θ of the body 2 and the number of engine revolutions Ne since it is not affected by the weight W. In the present embodiment, the wheel loader 1 does not directly detect the inclination angle θ of the body 2, and thus instead of detecting the inclination angle θ, the normalized hydraulic-force change rate k that can derive the inclination angle θ is calculated.

The normalized hydraulic-force change rate k is calculated by dividing the hydraulic-force change rate K before normalization by the average hydraulic force Fave according to the following equation (4), where the hydraulic-force change rate before normalization is K and the average hydraulic force within the predetermined measurement angle range is Fave. The hydraulic-force change rate K, which is the slope of the straight line L1, changes depending on the weight W, the inclination angle θ of the body 2, and the number of engine revolutions Ne. Therefore, by removing the effect of the weight W, the normalized hydraulic-force change rate k is uniquely determined by the inclination angle θ of the body 2 and the number of engine revolutions Ne. It should be noted that the hydraulic-force change rate K before normalization is calculated by obtaining the slope of the straight line L1 as the measurement result.

$$k = K/F\text{ave} \quad (4)$$

As described above, the normalized hydraulic-force change rate k is uniquely determined by the inclination angle θ of the body 2 and the number of engine revolutions Ne, and as described above, the intersection point angle α0 is also uniquely determined by the inclination angle θ of the body 2 and the number of engine revolutions Ne. Therefore, the inclination angle θ of the body 2 can be derived from the normalized hydraulic-force change rate k and the number of engine revolutions Ne, and the intersection point angle α0 can be derived from the inclination angle θ of the body 2 and the number of engine revolutions Ne. That is, the intersection point angle α0 is derived from the normalized hydraulic-force change rate k and the number of engine revolutions Ne, and the intersection point hydraulic force F0 is derived from the straight line L1.

Figure 4:
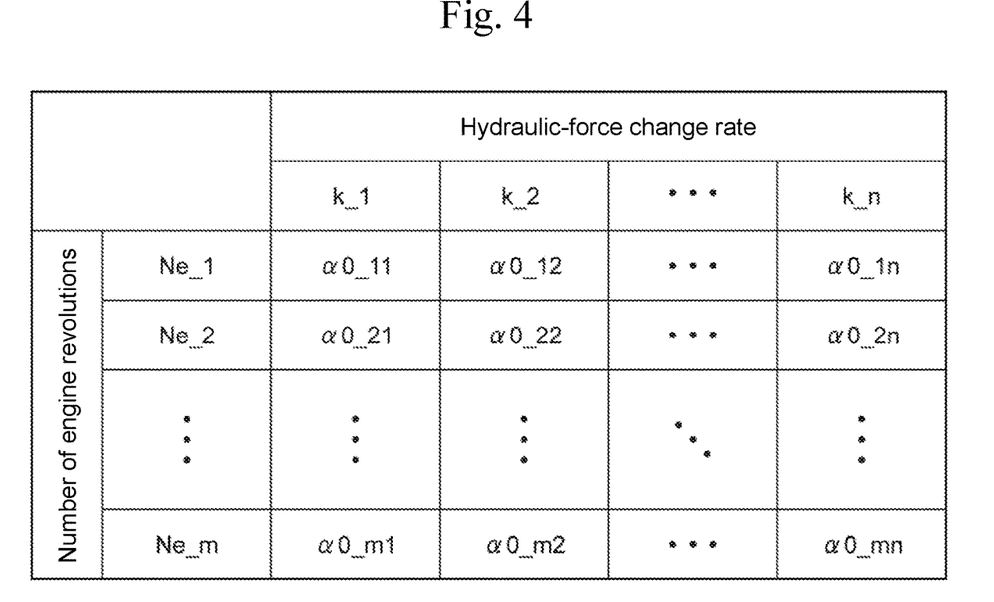
FIG. 4 is a table showing an intersection point angle table according to the first embodiment.

FIG. 4 is a table showing the intersection point angle table T1 according to the first embodiment. The intersection point angle table T1 stores therein the intersection point angle data (α0_11 ... α0_mn) in association with the number of engine revolutions (Ne_1 ... Ne_m) and the normalized hydraulic-force change rate (k_1 ... k_n). With reference to the intersection point angle table T1, the hydraulic force correction unit 33 calculates the intersection point angle α0 from the normalized hydraulic-force change rate k and the number of engine revolutions Ne. With reference to the intersection point angle table T1, the hydraulic force correction unit 33 can easily calculate the intersection point (α0, F0) between the straight line L1 in the measurement and the straight line L2 in the horizontal position of the body without performing complicated calculation processing.

Figure 5:
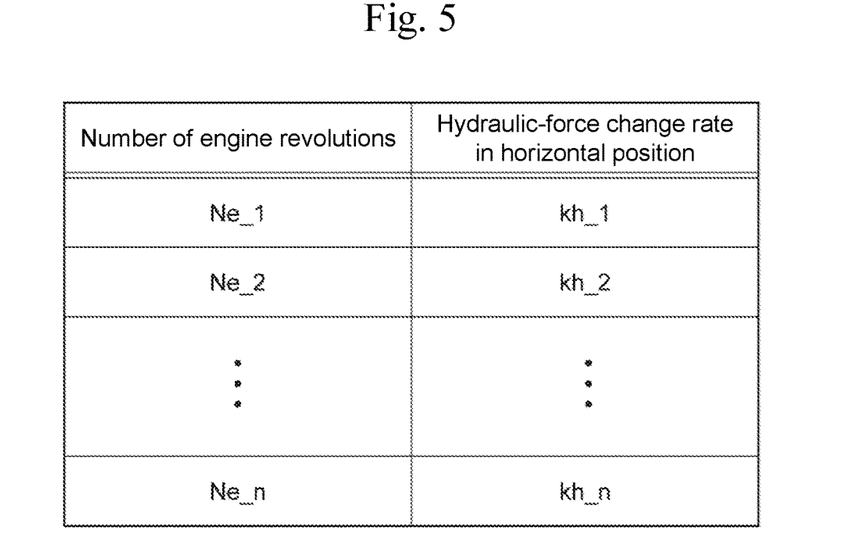
FIG. 5 is a table showing a hydraulic-force-change-rate table according to the first embodiment.

Next, the calculation processing of the hydraulic-force change rate Kh in the horizontal position of the body will be described. FIG. 5 is a table showing the hydraulic-force-change-rate table T2 according to the first embodiment. The normalized hydraulic-force change rate k is determined by the inclination angle θ of the body 2 and the number of engine revolutions Ne, but since the normalized hydraulic-force change rate kh is the change rate in the horizontal position of the body where the inclination angle θ is 0 degrees, it is determined by the number of engine revolutions Ne. Accordingly, the hydraulic-force-change-rate table T2 stores therein the normalized hydraulic-force-change-rate data (kh_1 ... kh_n) in association with the number of engine revolutions (Ne_1 ... Ne_n). With reference to the hydraulic-force-change-rate table T2, the hydraulic force correction unit 33 can easily calculate the normalized hydraulic-force change rate kh from the number of engine revolutions Ne.

The normalized hydraulic-force change rate kh satisfies the following equation (5), where the hydraulic-force change rate in the horizontal position of the body is Kh and the average hydraulic force within the predetermined measurement angle range is Fhave. The average hydraulic force Fhave in the horizontal position of the body satisfies the following equation (6), where the average hydraulic force in the measurement is Fave, the intersection point hydraulic force is F0, the hydraulic-force change rate in the horizontal position of the body is Kh, and the hydraulic-force change rate in the measurement is K, from the relation between the straight lines L1, L2.

$$kh = Kh/F\text{have} \quad (5)$$

$$F\text{have} = (F\text{ave} - F0) \times Kh/K + F0 \quad (6)$$

Next, the following equation (7) is derived from the above equations (5), (6), and the hydraulic-force change rate Kh in the horizontal position of the body is obtained from the equation (7). The normalized hydraulic-force change rate kh is obtained from the hydraulic-force-change-rate table T2, and the intersection point hydraulic force F0 is obtained from the intersection point angle α0. Further, the average hydraulic force Fave in the measurement and the hydraulic-force change rate K in the measurement are obtained from the measurement result (i.e., straight line L1). In this manner, the hydraulic force correction unit 33 calculates the hydraulic-force change rate kh from the number of engine revolutions Ne, and calculates the hydraulic-force change rate Kh, which is the slope of the straight line L2 in the horizontal position of the body.

$$Kh = kh \times F0/\{1 + (F0 - F\text{ave}) \times kh/K\} \quad (7)$$

The hydraulic force correction unit 33 calculates the intersection point (α0, F0) and the hydraulic-force change rate Kh in the horizontal position of the body, and calculates the straight line L2 from the straight line L1 as the measurement result. Then, the hydraulic force correction unit 33 calculates the hydraulic force Fh in the horizontal position of the body with respect to any given rotation angle α of the lift arm 7 by using the straight line L2, and corrects the error of the hydraulic force F occurring due to the inclination angle θ of the body 2. The hydraulic force correction unit 33 outputs the corrected hydraulic force Fh to the weight calculation unit 34. Using the existing calculation method, the weight calculation unit 34 calculates the weight W from the corrected hydraulic force Fh, the number of engine revolutions Ne, and the rotation angle α of the lift arm 7 and outputs the result to the monitor 40.

It should be noted that the reference tables such as the intersection point angle table T1 and the hydraulic-force-change-rate table T2 store therein the reference data that is referenced in the correction processing. The reference data is learned by the reference data learning unit 35. The reference data learning unit 35 learns the intersection point angle data ($\alpha 0\_11 \ldots \alpha 0\_mn$) as the reference data, and stores the intersection point angle data in association with the normalized hydraulic-force change rate k and the number of engine revolutions Ne in the intersection point angle table T1. The reference data learning unit 35 also learns the normalized hydraulic-force-change-rate data (kh_1 ... kh_n) in the horizontal position of the body as the reference data, and stores the hydraulic-force-change-rate data in association with the number of engine revolutions in the hydraulic-force-change-rate table T2.

The reference data learning unit 35 may learn the reference data while changing the weight W, and store the average of the learning values for the respective weights W as the reference data in the reference table. For example, the reference data learning unit 35 may learn the intersection point angle data when the weight is 3*t* and 5*t*, and store the average of the intersection point angle data on the weight 3*t* and on the weight 5*t* in the intersection point angle table T1. The reference data learning unit 35 may also learn the hydraulic-force-change-rate data in the horizontal position of the body when the weight is 3*t* and 5*t*, and store the average of the hydraulic-force-change-rate data on the weight 3*t* and on the weight 5*t* in the hydraulic-force-change-rate table T2. This configuration allows the hydraulic force correction unit to perform the correction processing with higher accuracy.

Figure 6:
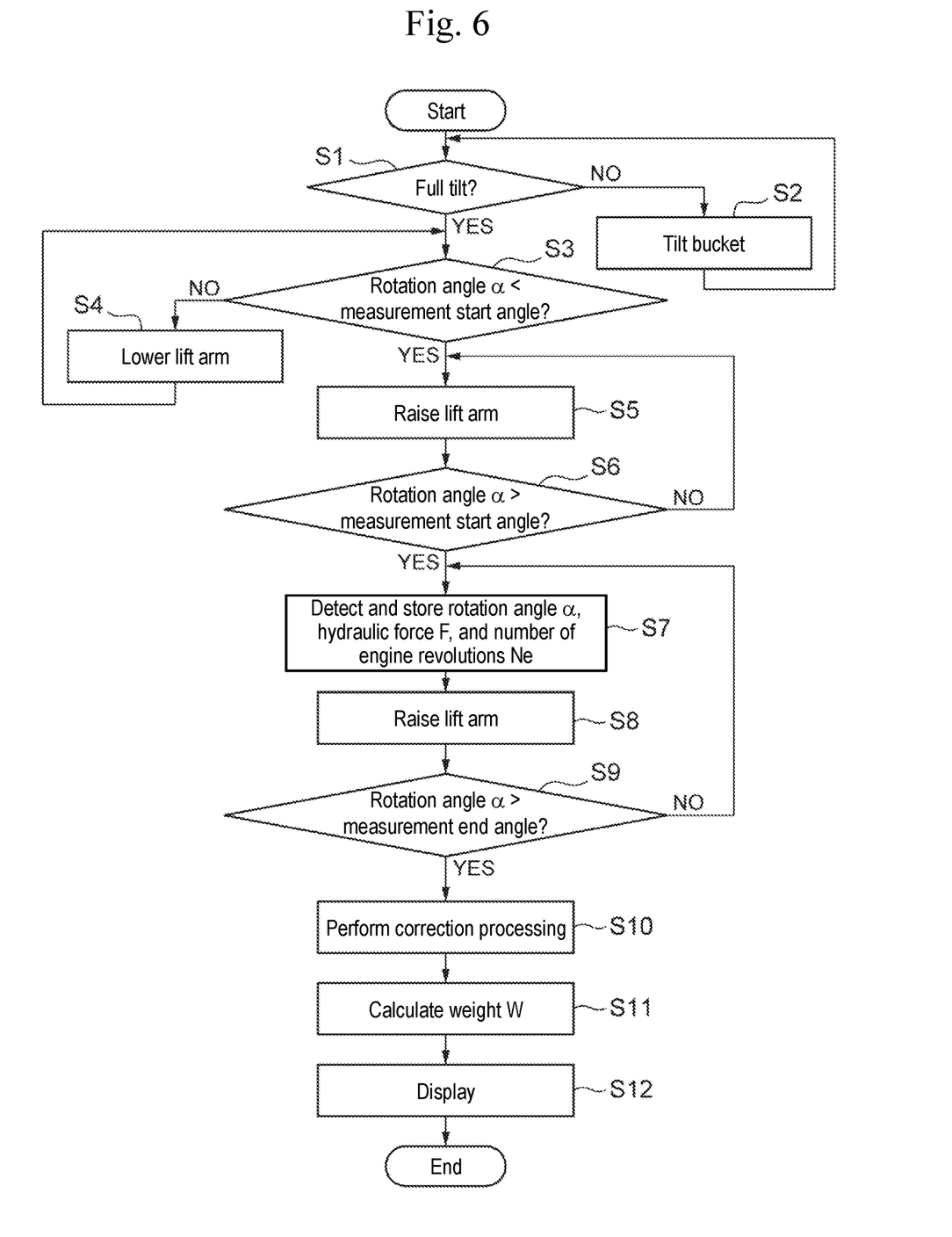
FIG. 6 is a flowchart of weight measurement processing according to the first embodiment.

The general flow of weight measurement processing will be described with reference to FIG. 6. FIG. 6 is a flowchart of the weight measurement processing according to the first embodiment. It should be noted that the following flowchart illustrates one of examples. The order of steps may be changed appropriately. Once the weight measurement processing begins, the controller 25 determines whether the bucket 3 is in a full tilt state (step S1). If the bucket 3 is determined not to be in the full tilt state (NO at step S1), the controller 25 rotates (tilts) the bucket 3 toward the operation room 5 until the bucket 3 turns to the full tilt state (step S2).

If the bucket 3 is determined to be in the full tilt state (YES at step S1), the controller 25 determines whether the rotation angle $\alpha$ of the lift arm 7 is smaller than a measurement start angle (step S3). If the rotation angle $\alpha$ of the lift arm 7 is determined to be equal to or larger than the measurement start angle (NO at step S3), the controller 25 lowers the lift arm 7 by a predetermined angle until the rotation angle $\alpha$ of the lift arm 7 is smaller than the measurement start angle (step S4). If the rotation angle $\alpha$ of the lift arm 7 is determined to be smaller than the measurement start angle (YES at step S3), the controller 25 raises the lift arm 7 by the predetermined angle (step S5).

When the lift arm 7 is raised, the controller 25 determines whether the rotation angle $\alpha$ of the lift arm 7 is larger than the measurement start angle (step S6). If the rotation angle $\alpha$ of the lift arm 7 is determined to be equal to or smaller than the measurement start angle (NO at step S6), the controller 25 raises the lift arm 7 until the rotation angle $\alpha$ of the lift arm 7 is larger than the measurement start angle. If the rotation angle $\alpha$ of the lift arm 7 is determined to be larger than the measurement start angle (YES at step S6), the controller 25 starts measurement of the hydraulic force F acting on the lift cylinder 8.

Once the measurement of the hydraulic force F begins, the bottom pressure detection unit 21 detects the bottom pressure $P_{btm}$, the rod pressure detection unit 22 detects the rod pressure $P_{rod}$, the arm angle detection unit 23 detects the rotation angle $\alpha$ of the lift arm 7, and the number-of-engine-revolutions detection unit 24 detects the number of engine revolutions Ne (step S7). At this time, the controller 25 obtains the hydraulic force F of the lift cylinder 8 from the bottom pressure $P_{btm}$ detected by the bottom pressure detection unit 21 and the rod pressure $P_{rod}$ detected by the rod pressure detection unit 22, and stores it in association with the rotation angle $\alpha$ of the lift arm 7. After the hydraulic force is measured with respect to any given rotation angle $\alpha$ of the lift arm 7, the controller 25 raises the lift arm 7 by the predetermined angle (step S8).

Then, the controller 25 determines whether the rotation angle $\alpha$ of the lift arm 7 is larger than a measurement end angle (step S9). If the rotation angle $\alpha$ of the lift arm 7 is determined to be equal to or smaller than the measurement end angle (NO at step S9), the processing at step S7 to step S9 is repeated until the rotation angle $\alpha$ of the lift arm 7 is larger than the measurement end angle. Accordingly, within the measurement angle range from the measurement start angle to the measurement end angle, the hydraulic force F of the lift cylinder 8 is measured at a plurality of locations while increasing the rotation angle $\alpha$ of the lift arm 7 by predetermined angles.

When the measurement processing of the hydraulic force F ends, the controller 25 performs various kinds of calculation processing from the measurement results, and obtains corrected information (i.e., the straight line L2 of FIG. 3A) indicating the relation between the hydraulic force Fh in the horizontal position of the body and the rotation angle $\alpha$ of the lift arm 7 (step S10). The flow of the correction processing will be described later. Next, the controller 25 calculates the weight W of the load from the hydraulic force Fh in the horizontal position of the body, the rotation angle $\alpha$ of the lift arm 7, and the number of engine revolutions Ne (step S11), and displays on the monitor 40 the weight W of the load in a state where the error occurring due to the inclination angle $\theta$ of the body 2 is corrected (step S12).

Figure 7:
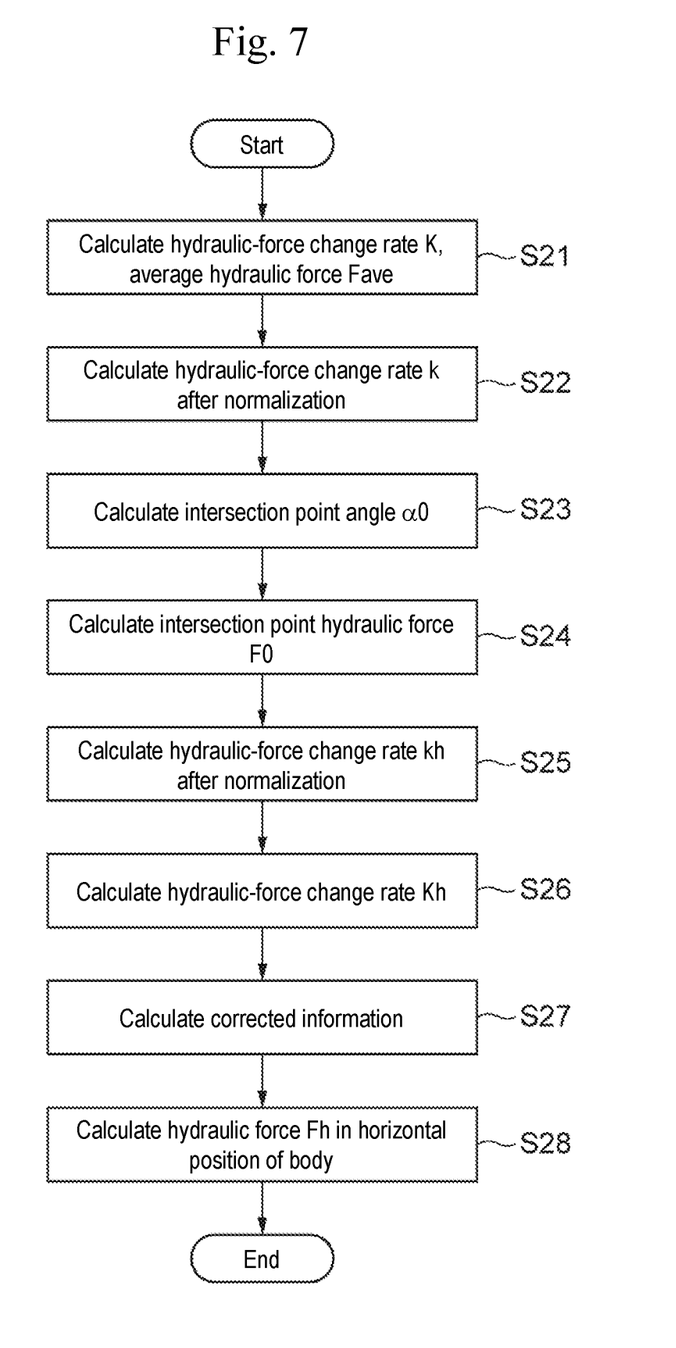
FIG. 7 is a flowchart of hydraulic force correction processing according to the first embodiment.

Next, the general flow of hydraulic force correction processing will be described with reference to FIG. 7. FIG. 7 is a flowchart of the hydraulic force correction processing. It should be noted that the following flowchart illustrates one of examples. The order of steps may be changed appropriately. Once the correction processing of the hydraulic force F begins, the controller 25 calculates the hydraulic-force change rate K in the measurement and the average hydraulic force Fave within the predetermined measurement angle range from the measurement result (i.e., the straight line L1 of FIG. 3A) of the hydraulic force F (step S21). Next, the controller 25 calculates the normalized hydraulic-force change rate k from the hydraulic-force change rate K and the average hydraulic force Fave by using the above equation (4) (step S22).

Next, the controller 25 calculates the intersection point angle $\alpha 0$ from the normalized hydraulic-force change rate k in the measurement and the number of engine revolutions Ne with reference to the intersection point angle table T1 (see FIG. 4) (step S23). Next, the controller 25 calculates the intersection point hydraulic force F0 corresponding to the intersection point angle $\alpha 0$ from the measurement result (i.e., the straight line L1 of FIG. 3A) of the hydraulic force F in the measurement (step S24). Next, the controller 25 calculates the normalized hydraulic-force change rate kh from the number of engine revolutions Ne with reference to the hydraulic-force-change-rate table T2 (see FIG. 5) (step S25).

Next, the controller 25 calculates the hydraulic-force change rate Kh in the horizontal position of the body from the hydraulic-force change rate kh, the intersection point hydraulic force F0, the average hydraulic force Fave, and the hydraulic-force change rate K by using the above equation (7) (step S26). Next, the controller 25 obtains corrected information (i.e., the straight line L2 of FIG. 3A) indicating the relation between the hydraulic force Fh in the horizontal position of the body and the rotation angle α of the lift arm 7 from the intersection point coordinates (α0, F0) and the hydraulic-force change rate Kh in the horizontal position of the body (step S27). With this corrected information, the controller 25 calculates the hydraulic force Fh in the horizontal position of the body with respect to any given rotation angle α of the lift arm 7 (step S28).

As described above, according to the first embodiment, when the wheel loader 1 works on an inclined ground, the error occurring due to the inclination angle θ of the body 2 is corrected, so that the weight of the load can be measured with high accuracy. In addition, although the hydraulic-force change rate K changes with effects of the inclination angle θ of the body 2 and the weight W of the load, it is possible to suppress the effect of the weight on the hydraulic-force change rate k by normalizing the hydraulic-force change rate K with the average hydraulic force Fave within the predetermined measurement angle range. Since the normalized hydraulic-force change rate k can be derived from the inclination angle θ of the body 2, the error of the weight W of the load occurring due to the inclination angle θ of the body 2 can be corrected by using the normalized hydraulic-force change rate k. Accordingly, the weight W of the load can be measured with high accuracy without detecting the inclination angle of the body 2.

Second Embodiment

Next, the wheel loader 1 according to the second embodiment will be described with reference to FIG. 8 to FIG. 11. It should be noted that the wheel loader 1 according to the second embodiment is different from that of the first embodiment in correcting a calculated weight W' with the inclination angle θ of the body 2. Therefore, the repeated description of the configurations that are similar to those of the first embodiment will be omitted to a minimum. In addition, the components having the same name are denoted by the same reference numeral for the sake of convenience of explanation.

Figure 8:
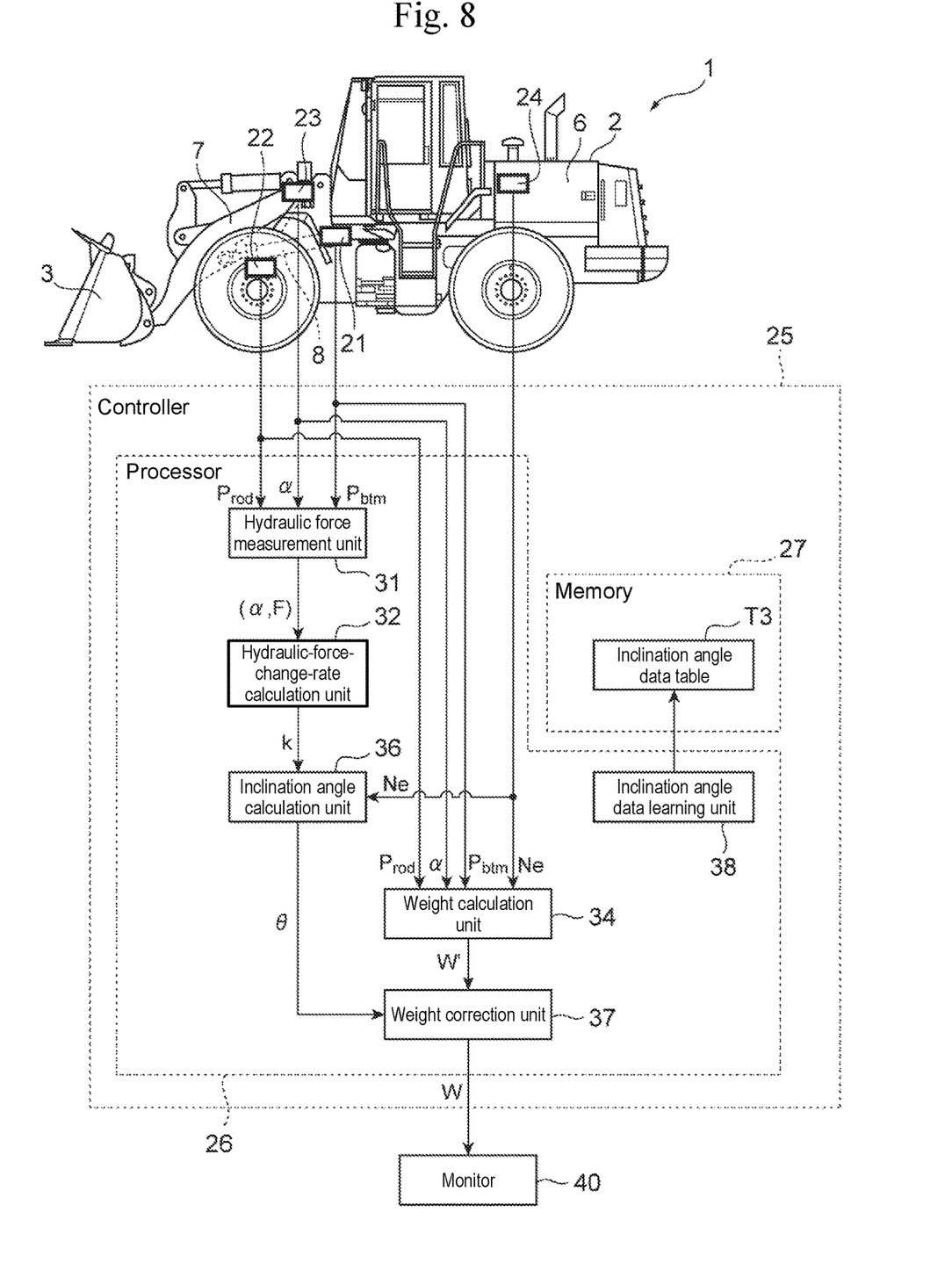
FIG. 8 is a configuration diagram of a weight measurement device according to a second embodiment.

FIG. 8 is a configuration diagram of the weight measurement device according to the second embodiment. A controller 25 includes a hydraulic force measurement unit 31, a hydraulic-force-change-rate calculation unit 32, an inclination angle calculation unit 36, a weight calculation unit 34, a weight correction unit 37, and an inclination angle data learning unit 38. The controller 25 is constituted of hardware such as a processor 26 and a memory 27, for example. The processor 26 implements each unit of the controller 25. Further, the memory 27 stores therein the reference tables such as an inclination angle table T3 and the like that are referenced by the inclination angle calculation unit 36, and parameters and programs that are used in various kinds of processing, for example.

The hydraulic force measurement unit 31 measures the hydraulic force F in the measurement on the basis of the pressure difference between the bottom pressure $P_{btm}$ and the rod pressure $P_{rod}$ with the rotation angle α of the lift arm 7 within a predetermined measurement angle range. The hydraulic-force-change-rate calculation unit 32 calculates the hydraulic-force change rate K, which is a change rate of the hydraulic force F with respect to the rotation angle α of the lift arm 7 from the measurement result of the hydraulic force F, normalizes the hydraulic-force change rate K with the average hydraulic force Fave within the measurement angle range, and calculates the normalized hydraulic-force change rate k. In the calculation processing, the normalized hydraulic-force change rate k is calculated on the basis of the above equation (4) from the hydraulic-force change rate K and the average hydraulic force Fave as in the first embodiment.

Figure 9:
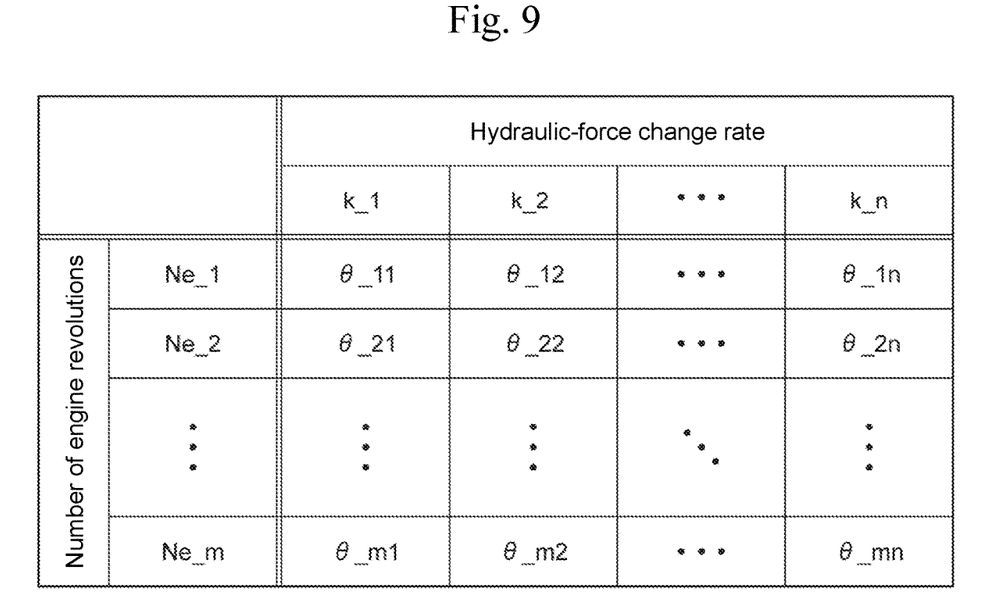
FIG. 9 is a table showing an inclination angle table according to the second embodiment.

The inclination angle calculation unit 36 receives the normalized hydraulic-force change rate k from the hydraulic-force-change-rate calculation unit 32, and receives the number of engine revolutions Ne from the number-of-engine-revolutions detection unit 24. The inclination angle calculation unit 36 calculates the inclination angle θ of the body on the basis of the number of engine revolutions Ne and the normalized hydraulic-force change rate k with reference to the inclination angle table T3. As described above, the normalized hydraulic-force change rate k is uniquely determined by the inclination angle θ of the body 2 and the number of engine revolutions Ne. Therefore, the inclination angle θ of the body 2 can be calculated from the normalized hydraulic-force change rate k and the number of engine revolutions Ne.

FIG. 9 is a table showing the inclination angle table T3 according to the second embodiment. The inclination angle table T3 stores therein the inclination angle data (0_11 ... 0_mn) in association with the number of engine revolutions (Ne_1 ... Ne_m) and the normalized hydraulic-force change rate (k_1 ... k_n). As described above, with reference to the inclination angle table T3, the inclination angle calculation unit 36 can easily calculate the inclination angle θ of the body 2 from the number of engine revolutions Ne and the normalized hydraulic-force change rate k, without performing complicated calculation processing. The inclination angle data in the inclination angle table T3 is learned in advance by the inclination angle data learning unit 38 while changing various conditions.

The weight calculation unit 34 receives the bottom pressure $P_{btm}$ from the bottom pressure detection unit 21, receives the rod pressure $P_{rod}$ from the rod pressure detection unit 22, receives the number of engine revolutions Ne from the number-of-engine-revolutions detection unit 24, and receives the rotation angle α of the lift arm 7 from the arm angle detection unit 23. The weight calculation unit 34 calculates the hydraulic force F on the basis of the pressure difference between the bottom pressure $P_{btm}$ and the rod pressure $P_{rod}$. Using the existing calculation method, the weight calculation unit 34 calculates the weight W' before correction on the basis of the hydraulic force F, the number of engine revolutions Ne, and the rotation angle α of the lift arm 7. The weight W' before correction includes an error caused by the inclination angle θ of the body 2.

Figure 10:
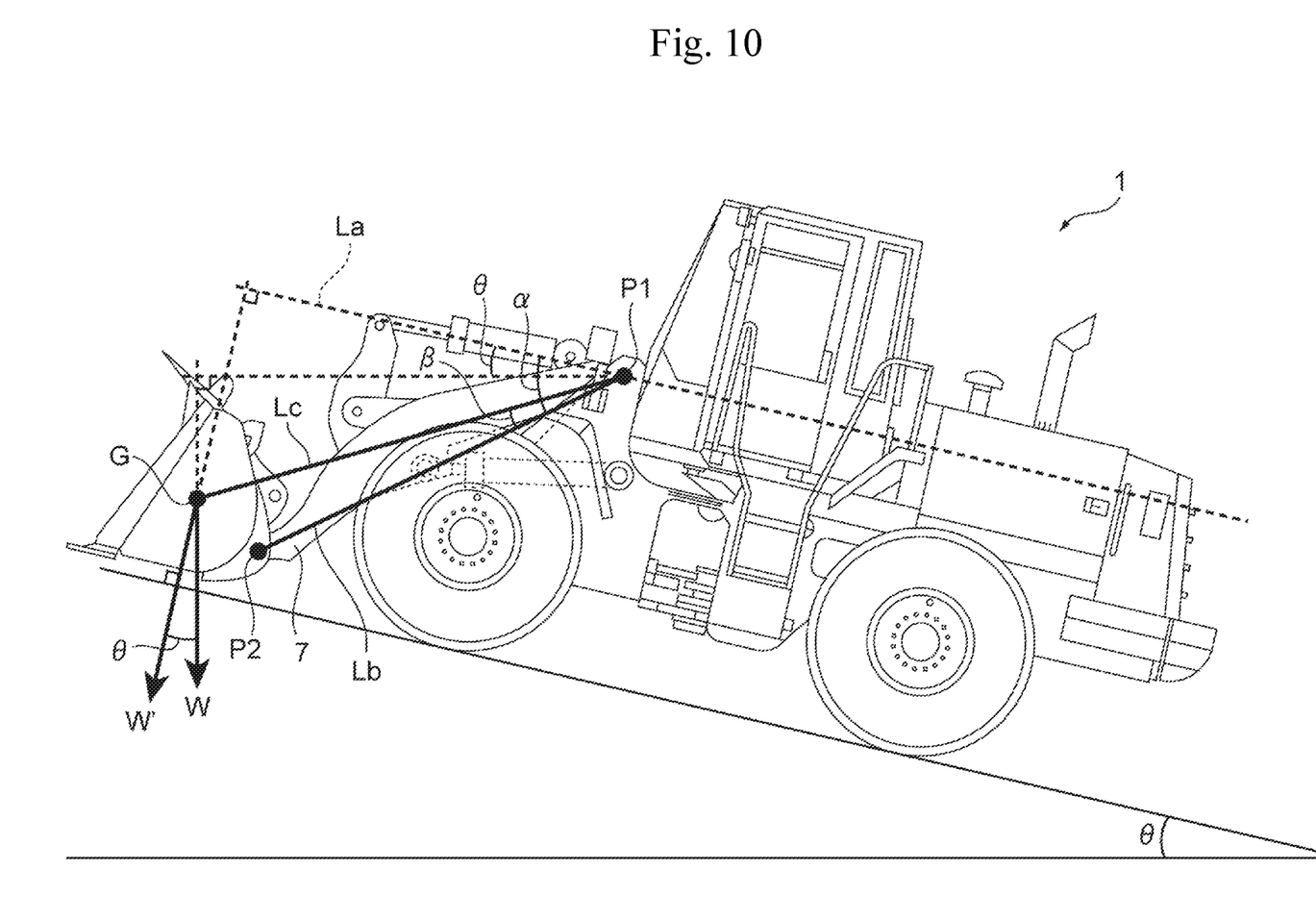
FIG. 10 is a view showing the relation between a weight before correction and a weight after correction according to the second embodiment.

The weight correction unit 37 receives the inclination angle θ of the body 2 from the inclination angle calculation unit 36, receives the weight W' before correction from the weight calculation unit 34, and receives the rotation angle α of the lift arm 7 from the arm angle detection unit 23. As illustrated in FIG. 10, the rotation angle α of the lift arm 7 is an angle between a straight line La that is parallel to a slope and a straight line Lb that connects a rotation center P1 of the lift arm 7 and a rotation center P2 of the bucket 3. The bucket's center of gravity G is not located on the extended line of the straight line Lb that extends along the lift arm 7. It should be noted that precisely, the load's center of gravity is different from the bucket's center of gravity G, but the load's center of gravity is regarded as the bucket's center of gravity G herein.

The weight W' before correction is the weight acting in the direction perpendicular to the slope with respect to the bucket's center of gravity G, and the corrected weight W is the weight acting in the direction perpendicular to the horizontal plane with respect to the bucket's center of gravity G. When β denotes the angle which a straight line Lc that connects the bucket's center of gravity G and the rotation center P1 forms with the straight line Lb that connects the rotation centers P1, P2, the corrected weight W can be obtained from the following equation (8), where the rotation angle α of the lift arm 7 is positive in downward rotation, and the angle β is a positive constant. As described above, the weight correction unit 37 corrects an error of the weight W' before correction on the basis of the inclination angle θ of the body 2.

$$W = W' \times \cos(\alpha - \beta) \div \cos(\alpha - \beta - \theta) \qquad (8)$$

The weight W of the load calculated by the weight correction unit 37 is displayed on the monitor (display unit) 40. The monitor 40 functions also as a notification unit for notifying that the weight W of the load is being corrected. This allows an operator to correctly recognize whether the weight displayed on the monitor 40 is the corrected weight. Furthermore, the inclination angle θ of the body 2 may be displayed on the monitor 40 in addition to the weight W. This allows the operator to correctly recognize the inclination of the body 2, thus making the operator be aware of the inclined attitude of the body 2 during digging work or loading work, so that safety of the work can be secured.

The inclination angle data learning unit 38 learns the inclination angle data (θ0_11 ... θ0_mn) and stores the inclination angle data in association with the normalized hydraulic-force change rate k and the number of engine revolutions Ne in the inclination angle table T3. The inclination angle data learning unit 38 accepts the input of the actual inclination angle θ of the body 2. When a learning value in the inclination angle data is out of the allowable range of the actual inclination angle θ of the body 2, the inclination angle data learning unit 38 may learn the inclination angle data again. This configuration allows the inclination angle data learning unit 38 to store only the learning values with a few errors in the inclination angle table T3 and allows the inclination angle calculation unit 36 to perform the calculation processing of the inclination angle θ with higher accuracy.

In addition, the inclination angle data learning unit 38 may learn the inclination angle data while changing the weight W, and store the average of the learning values for the respective weights W as the inclination angle data in the inclination angle table T3. For example, the inclination angle data learning unit 38 may learn the inclination angle data when the weight is 3t and 5t, and store the average of the inclination angle data on the weight 3t and on the weight 5t in the inclination angle table T3. This configuration allows the inclination angle calculation unit 36 to perform the calculation processing of the inclination angle θ with higher accuracy.

Figure 11:
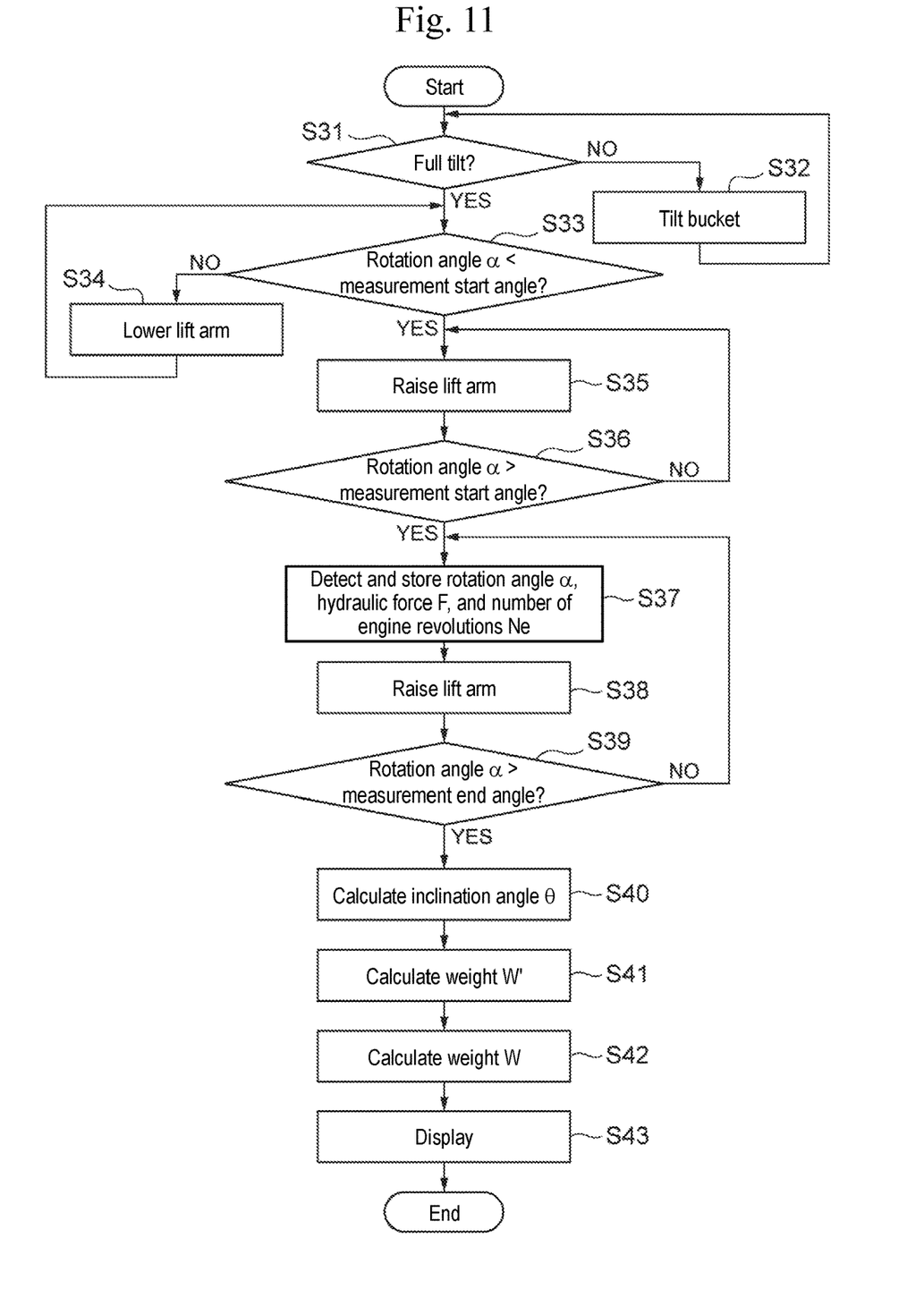
FIG. 11 is a flowchart of weight measurement processing according to the second embodiment.

The general flow of weight measurement processing will be described with reference to FIG. 11. FIG. 11 is a flowchart of the weight measurement processing according to the second embodiment. It should be noted that the following flowchart illustrates one of examples. The order of steps may be changed appropriately. The processing from step S31 to step S39 in the weight measurement processing of the second embodiment is equal to the processing from step S1 to step S9 in the weight measurement processing of the first embodiment. Within a predetermined measurement angle range, the hydraulic force F of the lift cylinder 8 is measured at a plurality of locations while increasing the rotation angle α of the lift arm 7 by predetermined angles.

When the measurement processing of the hydraulic force F ends, the controller 25 performs various kinds of calculation processing from the measurement results, and calculates the inclination angle θ of the body 2 (step S40). In the calculation processing of the inclination angle θ of the body 2, the controller 25 performs the processing equal to the correction processing in steps S21, S22 (see FIG. 7) of the first embodiment, and calculates the normalized hydraulic-force change rate k on the basis of the above equation (4) from the hydraulic-force change rate K and the average hydraulic force Fave. Then, the controller 25 references the inclination angle table T3 (see FIG. 9) and calculates the inclination angle θ of the body 2 from the normalized hydraulic-force change rate k and the number of engine revolutions Ne.

Next, the controller 25 calculates the weight W' before correction from the hydraulic force F, the rotation angle α of the lift arm 7, and the number of engine revolutions Ne (step S41). Then, the controller 25 corrects the weight W' (calculates the weight W) on the basis of the above equation (8) from the inclination angle θ of the body 2 (step S42), and the monitor 40 displays the weight W after the error of the inclination angle θ of the body 2 is corrected (step S43).

As described above, also in the second embodiment, when the wheel loader 1 works on an inclined ground, the error occurring due to the inclination angle θ of the body 2 is corrected, so that the weight of the load can be measured with high accuracy. In addition, in the second embodiment, it is possible to reduce the processing load of the weight correction processing and increase the working efficiency.

In the above embodiments, the hydraulic force measurement unit 31 measures the hydraulic force F multiple times while changing the rotation angle α of the lift arm 7. However, the hydraulic force measurement unit 31 only needs to measure the hydraulic force F for at least two rotation angles α. This can shorten the time required for measuring the hydraulic force F.

In the above embodiments, the configuration in which the monitor 40 functions as the notification unit for notifying that the weight W of the load is being corrected has been described, but the present disclosure is not limited to this configuration. Any notification unit may be employed, such as flashing of light, lighting, a beep, and a voice message, as long as the notification unit is capable of notifying that the weight W of the load is being corrected.

Further, some or all of the aforementioned structures, functions, processing units, processing means, and the like may be implemented as hardware by designing with an integrated circuit, for example. Alternatively, each of the aforementioned structures, functions, and the like may be implemented as software such that a processor analyzes and executes a program that implements each function. Information such as a program that implements each function, tables, and files can be stored in a storage device such as memory, a hard disk, or a SSD (Solid State Drive); or a storage medium such as an IC card, an SD card, or a DVD.

In addition, in the drawings, the control lines and information lines represent those that are considered to be necessary for description purposes, and represent not all control lines and information lines that are necessary for a product. In practice, almost all structures may be considered to be mutually connected.

Although the embodiments of the present disclosure have been described in detail above, the present disclosure is not limited to the aforementioned embodiments, and various design changes may be made within the scope of the claims without departing from the spirit of the present disclosure. For example, although the aforementioned embodiments have been described in detail to clearly illustrate the present disclosure, the present disclosure need not include all of the structures described in the embodiments. It is possible to replace a part of a structure of an embodiment with a structure of another embodiment. In addition, it is also possible to add, to a structure of an embodiment, a structure of another embodiment. Further, it is also possible to, for a part of a structure of each embodiment, add, remove, or substitute a structure of another embodiment.

REFERENCE SIGNS LIST

1 Wheel loader (work machine)
2 Body
3 Bucket (work implement)
7 Lift arm
8 Lift cylinder (hydraulic actuator)
21 Hydraulic force detection unit
21 Bottom pressure detection unit
22 Hydraulic force detection unit
22 Rod pressure detection unit
23 Arm angle detection unit
24 Number-of-engine-revolutions detection unit
25 Controller
31 Hydraulic force measurement unit
32 Hydraulic-force-change-rate calculation unit
33 Hydraulic force correction unit
34 Weight calculation unit
35 Reference data learning unit
36 Inclination angle calculation unit
37 Weight correction unit
38 Inclination angle data learning unit
40 Monitor (display unit)
T1 Intersection point angle table
T2 Hydraulic-force-change-rate table
T3 Inclination angle table

The invention claimed is:

1. A work machine comprising:
a lift arm with a work implement capable of loading a load;
a hydraulic actuator configured to rotate the lift arm;
a hydraulic force detection unit configured to detect a hydraulic force of the hydraulic actuator;
an arm angle detection unit configured to detect a rotation angle of the lift arm; and
a controller configured to calculate a weight of the load, wherein the controller is configured to:
measure the hydraulic force in a state where the rotation angle of the lift arm is within a predetermined measurement angle range,
calculate a change rate of the hydraulic force with respect to the rotation angle of the lift arm as a hydraulic force change rate, and then calculate a new hydraulic force change rate by dividing the hydraulic force change rate by an average hydraulic force within the predetermined measurement angle range, and
correct an error of the weight of the load occurring due to an inclination angle of a body on the basis of the new hydraulic force change rate.

2. The work machine according to claim 1, further comprising a number-of-engine-revolutions detection unit configured to detect a number of engine revolutions,
wherein the controller is configured to:
correct an error of the hydraulic force occurring due to the inclination angle of the body on the basis of the number of engine revolutions and the new hydraulic force change rate, and
calculate the weight of the load from the corrected hydraulic force, the number of engine revolutions, and the rotation angle of the lift arm.

3. The work machine according to claim 1,
wherein on the basis of a number of engine revolutions and the new hydraulic force change rate, the controller is configured to obtain corrected information indicating a relation between the rotation angle of the lift arm and the hydraulic force in a horizontal position of the body from a measurement result indicating a relation between the rotation angle of the lift arm and the hydraulic force in the measurement.

4. The work machine according to claim 1,
wherein the controller is configured to:
learn reference data in a reference table that is referenced in hydraulic force correction processing, and
learn reference data while changing the weight of the load and store in the reference table an average of learning values for respective loads as reference data.

5. The work machine according to claim 1, further comprising a number-of-engine-revolutions detection unit configured to detect a number of engine revolutions,
wherein the controller is configured to:
calculate the inclination angle of the body on the basis of the number of engine revolutions and the new hydraulic force change rate,
calculate the weight of the load from the hydraulic force, the number of engine revolutions, and the rotation angle of the lift arm, and
correct the error of the weight of the load on the basis of the inclination angle of the body.

6. The work machine according to claim 5,
wherein the controller is configured to:
learn inclination angle data indicating the inclination angle of the body as reference data in a reference table that is referenced in calculation processing of the inclination angle of the body, and
accept an input of an actual inclination angle of the body, and when a learning value in the inclination angle data is out of an allowable range of the actual inclination angle of the body, learn the inclination angle data again.

7. The work machine according to claim 6,
wherein the controller is configured to learn the inclination angle data while changing the weight of the load and store in the reference table an average of learning values for respective loads as the inclination angle data.

8. The work machine according to claim 5, further comprising a monitor configured to display the inclination angle of the body calculated by the controller.

9. The work machine according to claim 1, further comprising a monitor configured to notify that the error of the weight of the load is being corrected, the error occurring to the inclination angle of the body.

* * * * *